Figure 1:
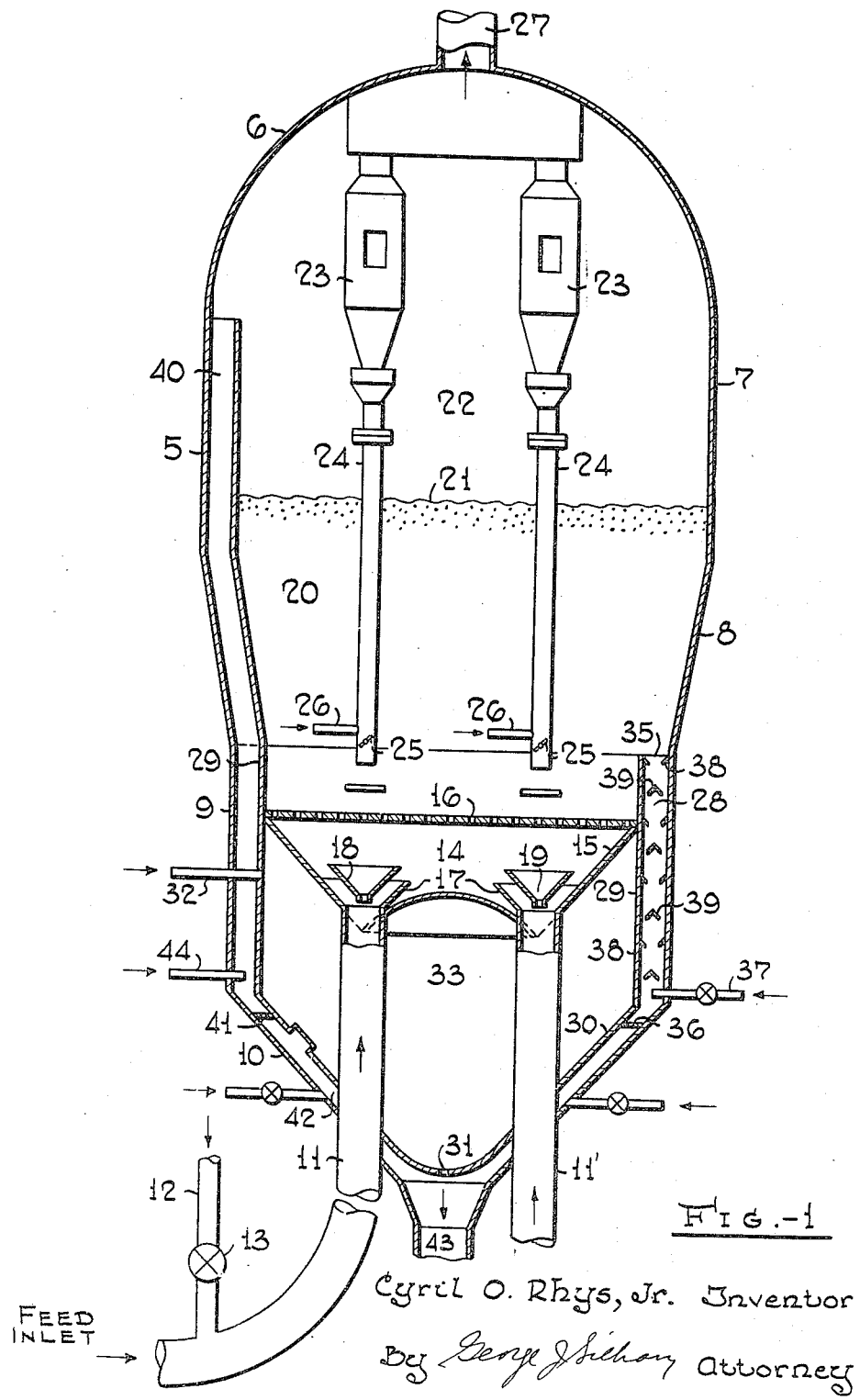

Patented Jan. 12, 1954

2,665,976

UNITED STATES PATENT OFFICE 2,665,976

DISTRIBUTORS IN FLUIDIZED SOLIDS REACTOR VESSELS

Cyril O. Rhys, Jr., Westfield, N. J., assignor to Standard Oil Development Company, a corporation of Delaware Application December 13, 1950, Serial No. 200,537

3 Claims. (Cl. 23—288)

This invention pertains to reactor vessels in which gaseous or vaporous reactants are contacted with finely divided solids in dense, fluidized, liquid-simulating condition and particularly to improved inlet means for insuring even distribution of the incoming charge of finely divided solids and reactants over the entire cross-section of the reactor vessel.

There has been developed in recent years a method which is commonly referred to as the fluidized solids technique in which finely divided solid catalyst particles are carried through a reaction zone in a stream of vapors undergoing reaction. This method or technique is applicable to a wide variety of catalytic reactions and while for purposes of illustration this invention will be specifically described in connection with the catalytic cracking of hydrocarbons, it is to be understood that the invention is not limited thereto, but may be used in other catalytic conversions of hydrocarbons or other catalytic or contacting processes wherein it is desired to bring about uniform distribution of vapors or gases and finely divided solid contact materials in a reactor vessel.

In the fluidized solids technique, vaporous reactants and catalyst or contact particles are introduced into the bottom of the reactor vessel, passed upwardly therethrough and then discharged through separation equipment in which the catalyst or contact particles are separated from vaporous reaction products and returned to the reactor vessel preferably after a regeneration treatment. In a modified or improved design of catalytic cracking unit, catalyst and reactants are continuously supplied to the reactor. The velocity of the hydrocarbon vapors is so regulated as to maintain a dense, dry, fluidized, liquid-simulating bed of catalyst having a definite level in the lower portion of the reactor vessel surmounted by a dilute phase, relatively free of catalyst particles in the upper portion of the vessel. Reaction products are taken overhead from the reactor vessel and passed through cyclone separators or the like to remove entrained catalyst. Catalyst is separately withdrawn directly from the dense bed, passed to a regenerator where carbonaceous deposits are burned off and then recycled to the reactor vessel.

In a commercial scale cracking reactor designed to catalytically crack approximately 40,000 barrels of gas oil per day the reactor vessel is about 30 feet in diameter and contains a dense fluidized bed of catalyst particles some fifteen to twenty feet deep. In such a unit catalyst is circulated from the reactor, through the regenerator and back into the reactor at a rate of about 60 tons per minute.

In the operation of such a reactor system it is desirable, if not essential, to distribute the vapor and catalyst mixture evenly over the entire cross section of the reactor vessel and the air and spent catalyst mixture over the entire cross section of the regenerator vessel. Poor distribution of the feed stock and catalyst in the reactor affects the final product distribution. Poor distribution of spent catalyst and air or regeneration gas in the regenerator could result in poor carbon burning rates per cubic foot requiring a larger vessel than would be necessary if good distribution were insured. Distribution grids are arranged in the lower portion of the reactor and regenerator vessels but they are insufficient to distribute the large quantities of materials involved uniformly across the entire cross section of the reactor and regenerator vessels.

It is the object of this invention to provide inlet means which will distribute large quantities of materials uniformly over the entire cross section of large reactor vessels.

It is also the object of this invention to provide inlet means which will serve to prevent solid catalyst particles from slipping back into the inlet pipe or lines.

These and other objects will appear more clearly from the detailed specification and claims which follow.

In accordance with the present invention an inverted distributor cone is placed over the discharge end of the inlet line below the distribution grid in the bottom portion of the vessel. The clearances between the discharge end elements of the inlet line and the distributor cone and between the conical or sloping wall or housing member of the vessel and the distributor cone are calculated to insure that the velocity of the vapors remains about constant at all points and roughly equal to the inlet line velocity. By maintaining a relatively high velocity at all points it becomes impossible for the catalyst to flow down into the inlet line. The inverted distributor cone diverts the incoming stream of vapors toward the outside of the vessel where most of the area is located, thereby insuring good vapor distribution over the major portion of the cross sectional area of the vessel.

Reference is made to the accompanying drawing illustrating the present invention.

Figure 2:
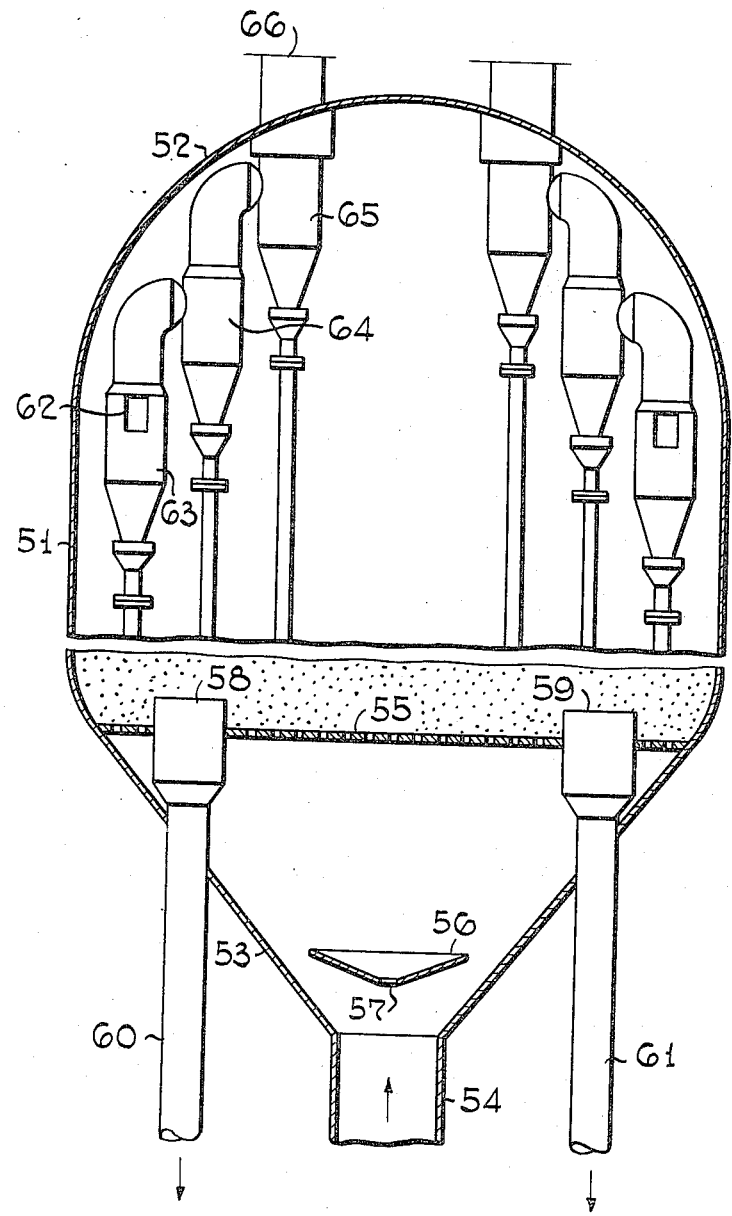

In the drawing, Fig. 1 represents a vertical elevation, partly in section of an apparatus embodying the present invention, and Fig. 2 is a vertical elevation, partly in section, of another form of reactor vessel having a distributor cone in accordance with the present invention.

Referring to Fig. 1, the reaction vessel 5 comprises an upper, hemispherical dome section 6, a large cylindrical section 7, a frusto conical section 8, a relatively smaller cylindrical section 9, a frusto conical bottom section 10 and is provided with two inlet lines 11 and 11' for the introduction of a mixture of reactants and catalyst or contact particles. The catalyst is introduced into inlet line 11 from a standpipe or the like 12 of sufficient height to create a head of catalyst fluistatic pressure sufficient to introduce catalyst into the reactor. A slide valve 13, or the like is provided near the base of the standpipe to control the rate at which catalyst particles are supplied to the line 11 from the standpipe. A similar standpipe and slide valve is provided for the introduction of catalyst into inlet line 11'.

Feed stock in vaporized or liquid form is supplied to the inlet line 11 and carries the solid catalyst or contact particles in suspension into an inlet chamber 14 comprising an upwardly flared wall member 15 and a grid member or perforated distribution plate 16 at its upper end. The discharge ends of the inlet lines 11 and 11' are preferably flared as at 17 and an inverted conical inlet baffle 18 is centrally disposed over the discharge end of the inlet lines 11 and 11' in order to distribute the incoming charge into the inlet chamber 14. As shown in Fig. 1, the walls of the inverted cone are spaced at a uniform distance from the outwardly flared ends of the inlet pipes 11 and 11'. As is shown in Fig. 2 and as will be more fully described below, the clearances between the walls of the distributor cones and the flared ends of the inlet pipes may be calculated to insure a constant vapor velocity through the initial distributor and roughly equal to the inlet line velocity in order to prevent catalyst from settling back down into the inlet line. A vent hole 19 is provided at the apex of the inverted conical baffle member 18 in order to prevent the accumulation of catalyst therein.

In the form of apparatus shown in Fig. 1, the reaction vessel is circular in cross section and the perforated distribution plate or grid member 16 is circular and centrally arranged in the reaction vessel. The diameter of the grid member 16 is less than the internal diameter of the smaller cylindrical section 9 of the reaction vessel to provide an annular passageway for the withdrawal of catalyst particles from the lower portion of the reaction vessel.

The velocity of the gaseous reactant fluid passing upwardly in the reaction vessel 5 is preferably so controlled as to maintain the solid contact or catalyst particles as a dense fluidized, liquid-simulating, dry mixture or bed 20 having a level indicated at 21. The vaporous reaction products leaving the dense bed 20 entrain a small amount of solid catalyst particles forming a dilute phase or suspension designated at 22 in the upper portion of the reaction chamber 5, in other words in the upper portions of the large cylindrical section 7 and in the dome shaped top section 6.

The reaction products and entrained catalyst particles are passed through separating means 23 arranged in the upper portion of the reaction vessel. This separating means, which may be a cyclone separator or the like, separates most of the entrained solid catalyst particles from the vaporous reaction products. The solid catalyst particles separated in cyclones 23 are returned to the dense bed 20 through dip legs or pipes 24 which extend below the upper level 21 of the dense bed 20. Dampers 25 for controlling return of catalyst particles to the dense bed and steam lines 26 for fluidizing the separated catalyst particles are sometimes provided in the dip legs 24. The vaporous reaction product leaving the separating means 23 pass overhead through line 27 and may then be passed to suitable product recovery and processing equipment.

Removal of catalyst particles from the dense phase or bed 20 is effected through the stripping zone generally indicated at 28 which is formed between the inner wall of the small cylindrical section 9 and a concentric vertically arranged sleeve 29 of smaller diameter which surrounds the perforated distribution plate or grid 16 and extends some distance above and below said distribution plate. The upper end of the wall member 15 is preferably secured as by welding to grid plate 16 as well as to the sleeve member 29. Secured to the bottom of sleeve member 29 is a conical baffle member 30 for reducing the effective volume below the inlet chamber 14. The conical member 30 is arranged substantially equidistant from the lower conical section 10 of the reactor and is provided with a vent hole 31. A steam bleed line 32 is provided for supplying steam or other purging gas to the chamber 33 formed by walls 15, 29 and 30 to prevent the accumulation of catalyst particles therein.

The annular space 28 formed between the inner wall of the cylindrical section 9 and cylindrical sleeve 29 is subdivided into a plurality of long narrow stripping zones or sections by means of radial baffles having upper edges 35 at the top of cylindrical sleeve 29 and bottom edges 36 which are located at or below the bottom of cylindrical sleeve 29. The number of radial baffles and accordingly the number of stripping zones provided may be varied as desired. Inlets 37 for the supply of steam or other stripping agent are arranged at the bottom of each of the stripping cells. The stripping cells are preferably provided with suitable baffles 38 and 39 in order to increase the mixing or contact of the upflowing stripping or purging gas and the downflowing spent or contaminated catalyst. If desired, one or more vent cells 40 may be provided in order to vent vapors from the annular cone 42 between the bottom section and the conical wall member 30 which are introduced in order to fluidize the catalyst in the conical portion or in the standpipe 43 or are formed in the cracking of hydrocarbons on the spent catalyst or by degassing of the stream of spent catalyst. The vent calls 40 are provided with inlets 44 for the supply of steam or other fluidizing gas and as shown extend well above the maximum bed level 21 of the dense phase.

In order to equalize flow of catalyst through the several stripping cells an orifice plate 41 may be provided at the bottom of each of the stripper cells. The orifices in said plates are so designed to give a pressure drop of from 0.5 to 2.0 lbs. per sq. inch. Instead of having an orifice at the bottom of the stripper cells, the stripper cells can be extended above the dense bed level and an opening or orifice provided for controlling the flow of catalyst from the dense bed into each of the stripping cells or a combination of the two can be employed.

The catalyst particles discharged from the stripping cells flow downwardly in the annular conical section 42 and are discharged into standpipe 43 which leads to a regenerator or the like for revivifying the spent, stripped catalyst in known manner.

Fig. 2 illustrates another embodiment of the inverted conical distributor member in a reactor vessel particularly adapted for regeneration of finely divided catalyst particles. This reactor comprises a cylindrical body section 51, a dome shaped top section 52 and an inverted conical bottom section 53. An inlet pipe 54 is connected to the bottom of the reactor vessel for the supply of catalyst and reactant or regeneration gas thereto. A perforated distribution plate or grid 55 is arranged in the lower portion of the reactor vessel.

In order to improve the distribution of the incoming catalyst and reactant or regeneration gas over the entire cross section of the vessel an inverted cone member 56 is arranged centrally over the end of inlet conduit 54. A vent hole 57 is provided at the apex of cone member 56 in order to prevent the accumulation of catalyst therein. The clearance between the inlet lines 54 and cone member 56 and between the walls of cone member 56 and the bottom walls 53 of the vessel are calculated to insure that the velocity of the vapors remains substantially constant at all points and roughly equal to the inlet line velocity. By maintaining a relatively high velocity at all points it becomes impossible for catalyst to flow down into the inlet line. The distributor cone diverts the incoming vapors or gases toward the outside of the vessel where the greater part of the area of the vessel is located and effectively prevents localization or jetting of the gaseous materials up through the center of the vessel.

Catalyst particles accumulate as a dense, fluidized, liquid-simulating bed above the distribution grid 55 and catalyst is withdrawn from this bed directly into wells 58 and 59 forming the inlets for regenerated catalyst standpipes 60 and 61. Reaction gases are withdrawn from the dilute phase in the upper portion of the reactor vessel through outlet port 62 and thence through cyclone separators 63, 64, and 65 which serve to knock out substantially all of the entrained catalyst particles the gases passing from the last cyclone stage into outlet conduit 66 and thence to the atmosphere, or, if desired, to further processing equipment.

The foregoing description contains a limited number of embodiments of the present invention. It will be understood that numerous variations are possible without departing from the scope of the following claims.

What is claimed is:

1. A reactor for the contact of vaporous or gaseous reactants and finely divided contact or catalyst particles which comprises a vertical vessel, a perforated distributor plate arranged horizontally in the lower portion of said vessel, an outlet for gaseous reaction products in the top of said vessel, a vertical inlet pipe for the introduction of vaporous reactants and finely divided solids connected to the bottom of said vessel said inlet pipe terminating below said perforated distribution plate having a flaring discharge end and an inverted conical distributor member arranged directly above the discharge end of said inlet pipe in such spatial arrangement and relationship as to distribute the flow evenly and at substantially the same linear rate as in said inlet pipe.

2. A reactor for the contact of vaporous or gaseous reactants and finely divided contact or catalyst particles which comprises a vertical vessel, an outlet for gaseous reaction products in the top of said vessel, an inlet chamber for reactants and solid contact particles arranged in the lower portion of said vessel, the walls of said inlet chamber consisting of a cylindrical sleeve member of smaller diameter than the interior of said vessel and uniformly spaced from the inner walls of the vessel, a perforated distribution grid arranged horizontally and secured to said cylindrical sleeve member, a frusto-conical distributing member below said grid with its larger end toward said grid, a pair of vertical inlet pipes for the introduction of vaporous reactants and finely divided solids terminating within said inlet chamber below said perforated grid in a flaring discharge portion which merges with said frusto-conical member and an inverted conical distributor member arranged directly above the discharge portion of each of said inlet pipes the external conical surfaces of said distributor members being arranged substantially parallel to said flaring discharge portions and spaced therefrom so as to cause said solids to flow therebetween uniformly at substantially the same linear rate as in said inlet pipes.

3. A reactor for the contact of vaporous or gaseous reactants and finely divided contact or catalyst particles which comprises a vertical vessel, a perforated distributor plate arranged horizontally in the lower portion of said vessel, an outlet for gaseous reaction products in the top of said vessel, a vertical inlet pipe for the introduction of vaporous reactants and finely divided solids connected to the bottom of said vessel said inlet pipe terminating below said perforated distribution plate and an inverted conical distributor member arranged directly above the discharge end of said inlet pipe and arranged to spread the flowing solids laterally into a generally conical pattern, the clearances between said inverted conical distributor member and the end of the inlet pipe and bottom of the vessel being calculated to insure maintenance of the gas velocity substantially equal to the inlet line velocity.

CYRIL O. RHYS, Jr.

References Cited in the file of this patent

UNITED STATES PATENTS

| Number | Name | Date |
|---|---|---|
| 2,357,901 | Lewis et al. | Sept. 12, 1944 |
| 2,379,734 | Martin | July 3, 1945 |
| 2,386,491 | McOmie | Oct. 9, 1945 |
| 2,409,780 | Mekler | Oct. 22, 1946 |
| 2,418,003 | Angell | Mar. 25, 1947 |
| 2,421,212 | Medlin | May 27, 1947 |
| 2,468,508 | Munday | Apr. 26, 1949 |
| 2,514,288 | Nicholson | July 4, 1950 |
| 2,589,124 | Packie | Mar. 11, 1952 |
| 2,608,474 | Gilliam | Aug. 26, 1952 |
| 2,612,437 | Kaulakis et al. | Sept. 30, 1952 |